United States Patent [19]
Cator et al.

[11] 3,831,962
[45] Aug. 27, 1974

[54] STEERABLE TANDEM AXLE SUSPENSION
[75] Inventors: Dennis W. Cator, London, Ontario;
 Roger W. Campbell, Melbourne, Ontario; Gerardus L. Felix, London, Ontario, all of Canada
[73] Assignee: General Motors Corporation, Detroit, Mich.
[22] Filed: Sept. 12, 1973
[21] Appl. No.: 396,572

[52] U.S. Cl. ............................. 280/81 A, 180/24.01
[51] Int. Cl. ............................................. B62d 13/02
[58] Field of Search......... 180/24.01, 24.06, 79.2 C, 180/79.2 R, 79.5; 280/81 A, 81 R, 104.5 R, 104.5 A, 104.5 B

[56] References Cited
UNITED STATES PATENTS
2,954,985 10/1960 Drong.......................... 180/24.01 X
3,051,506 8/1962 Stump.............................. 280/81 A
3,149,858 9/1964 Gilbert....................... 280/104.5 X

*Primary Examiner*—David Schonberg
*Assistant Examiner*—Terrance L. Siemens
*Attorney, Agent, or Firm*—Edward J. Biskup

[57] ABSTRACT

A steerable tandem axle suspension for supporting the rear end of a vehicle frame and including first and second transversely extending rear axles each having rotatable wheels at the opposite ends thereof. Each of the axles is formed with a housing having an arm which projects towards the other axle and a steering actuator is located between the axles. The projecting arm of each axle is supported by the steering actuator while the axle housing has an upper portion thereof connected by a swivel assembly to the vehicle frame. The arrangement is such that upon movement of the steering actuator, each rear axle is pivoted about a vertical axis passing through the associated swivel assembly to provide steering movement of the axles.

4 Claims, 12 Drawing Figures

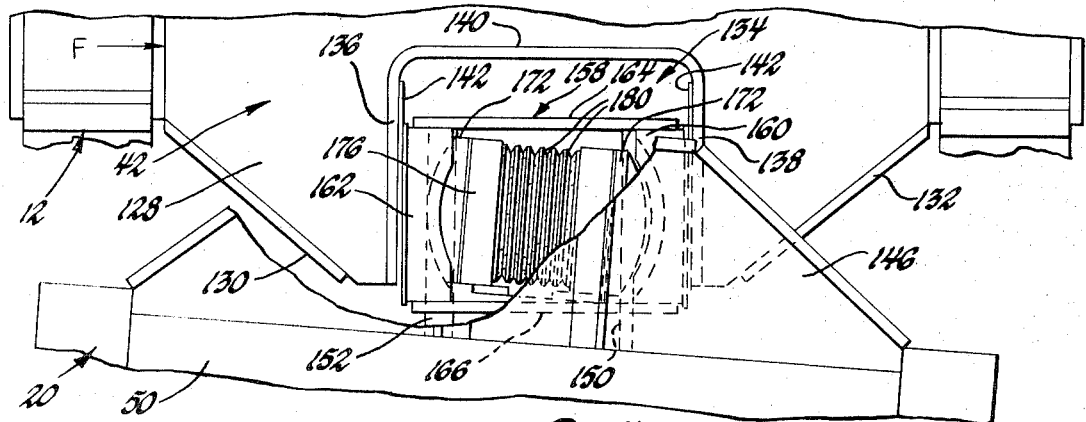
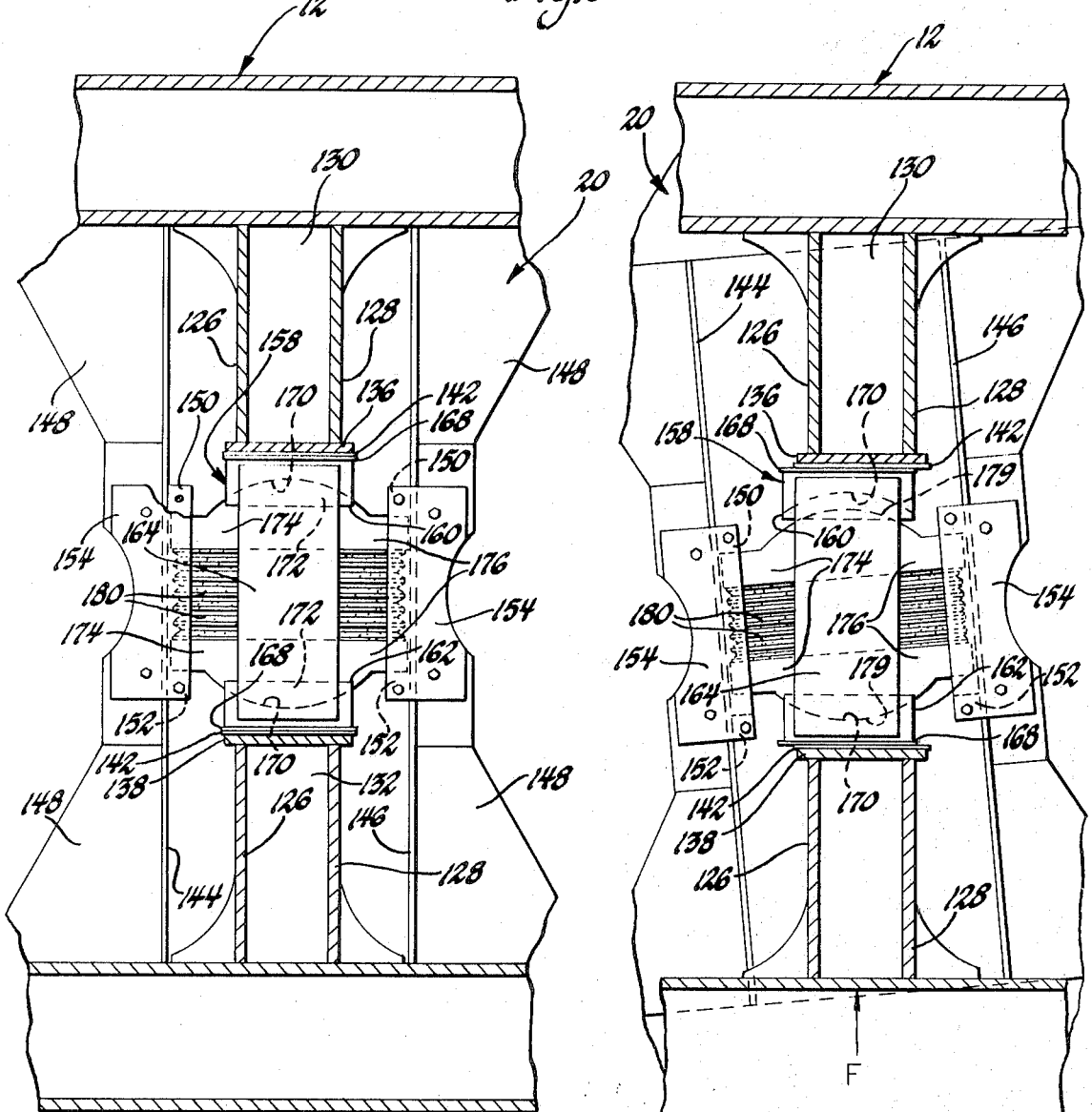

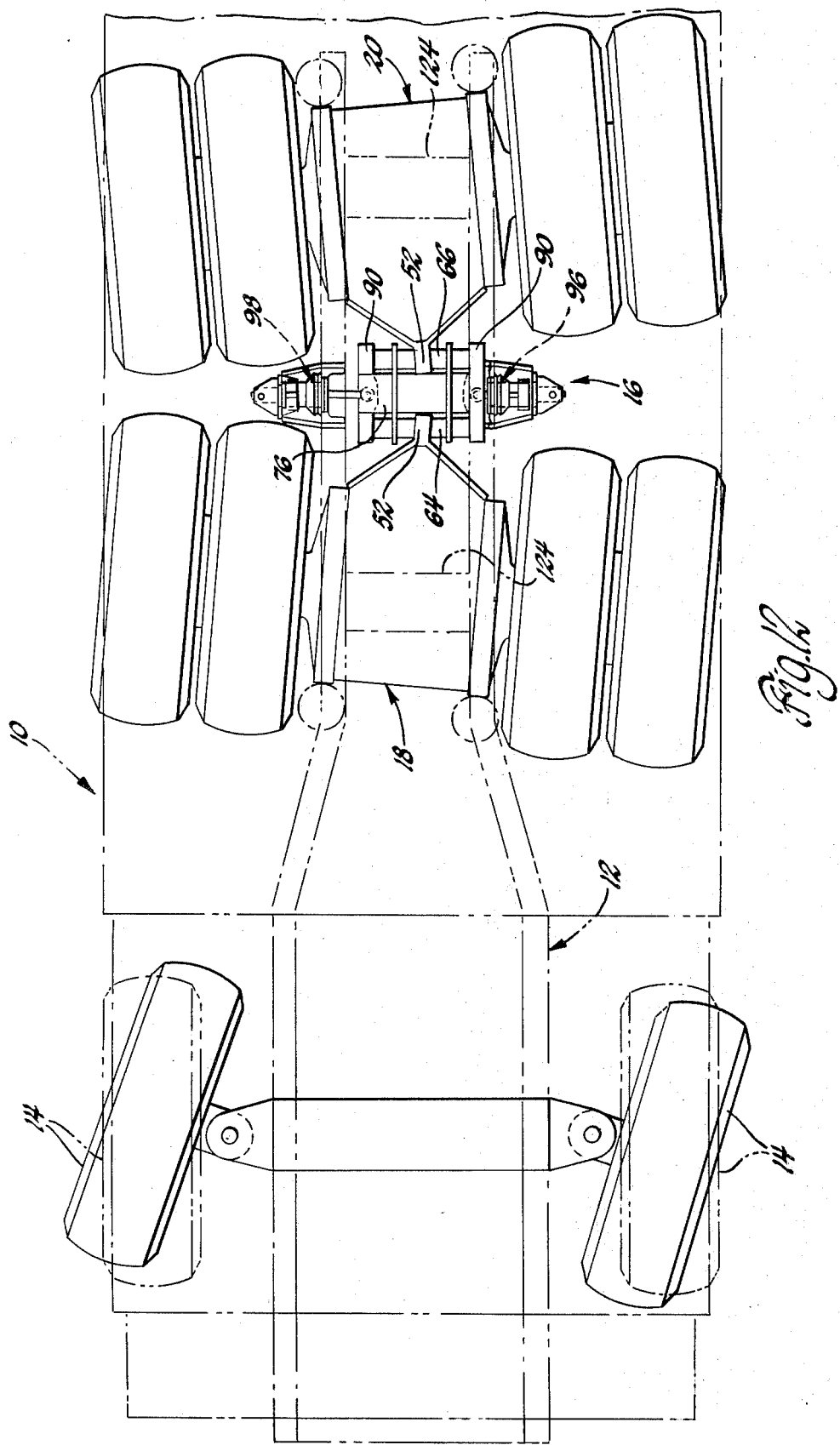

STEERABLE TANDEM AXLE SUSPENSION

As is well known, all six-wheeled vehicles experience a certain amount of lateral slippage or tire scuffing when curves are being negotiated. This occurs because when two of the axles of a vehicle are held in rigid parallelism, the rotational axes of all the wheels cannot possibly pass through a single point or a vertical line, and therefore, when corners are being turned some of the wheels necessarily must slip sideways. In the past, this slippage has been reduced somewhat by designing the axle arrangement so that the rear axles are not held rigidly parallel. This was done by having the axles connected by springs to the vehicle frame so that on curves, the centrifugal force acting on the spring-supported mass transferred the load from the inner to the outer spring. Depending upon the curvature of the springs, this caused a shortening of the inner spring and lengthening of the outer spring with the result that the axles moved out of parallelism in such a way as to improve the steering conditions and reduce the scuffing action.

This invention concerns a six-wheeled vehicle of the type described above and is particularly directed to a tandem rear axle suspension that provides steering movement of the axles in response to steering movement of the front wheels. Thus, rather than relying on springs lengthening and shortening as a result of centrifugal force for providing steering movement of the rear axles, the present invention incorporates positive steering means in the form of power-operated hydraulic cylinders which are connected to the rear axles and cause the latter to be simultaneously rotated about longitudinally spaced vertical axes so as to minimize slippage and tire scuffing as the vehicle corners.

More specifically, the present invention contemplates a steerable tandem axle suspension for supporting the rear end of a six-wheeled vehicle frame that includes first and second transversely extending axles each of which has rotatable wheels at the opposite ends thereof. Each of the axles is formed with a housing which has an arm that projects along the longitudinal center axis of the vehicle frame towards the other axle. A steering actuator is carried by the vehicle frame between the axles and has rod means supported for axial movement along an axis that is perpendicular to the longitudinal axis of the vehicle. Each of the projecting arms extending from the axles is connected by a spherical connection to the rod means, and in order to provide a vertical axis about which each axle can pivot during steering movement, a swivel assembly is provided which is located midway between the wheels of each axle and serves to connect the upper end of the axle housing to the vehicle frame. The swivel assembly includes resilient means for limiting lateral movement of the vehicle frame while allowing vertical movement of the associated axle and also movement thereof about the longitudinal center axis of the vehicle. Suitable power-operated means are provided and connected to the rod means for moving the latter axially and therby causing the first and second axles to be steered about the aforementioned vertical axis in response to steering movement of the front wheels. In addition, a pair of transversely spaced ride cylinders are pivotally connected between each axle and the vehicle frame for cushioning oscillatory movement of the axle.

The objects of the present invention are to provide a six-wheeled vehicle having a tandem axle arrangement at the rear end thereof that is steerable in response to steering movement of the front wheels; to provide a steerable tandem axle suspension in which each axle is supported intermediate its ends by a swivel assembly which serves to resiliently limit lateral movement of the axle while allowing vertical movement thereof and also allowing movement about the longitudinal center axis of the vehicle; to provide a steerable tandem axle suspension which is supported by a pair of linearly deflectable ride cylinders and in which an arm is supported by a steering actuator and moves along transverse axes for causing steering movement of the axle; and to provide a tandem axle suspension in which each axle is formed with an arm which projects towards the other axle and is supported by a steering actuator which moves each arm along a transversely extending axis so as to cause the axles to be steered about longitudinally spaced vertical axes which are movable towards and away from the steering actuator during the steering movement of the axle.

Other objects and advantages of the present invention will be apparent from the following detailed description when taken with the drawings in which:

FIG. 5 is a view similar to FIG. 4 but shows the axle tilted about the longitudinal axis of the vehicle;

FIG. 6 is a plan view taken on lines 6—6 of FIG. 4;

FIG. 7 is a view similar to FIG. 6 but shows the axle rotated about a vertical steer axis into a steered position with lateral forces acting on the vehicle frame;

FIG. 12 is a plan view schematically showing the vehicle of FIG. 1 with the wheels thereof in a turned position.

Figure 1:
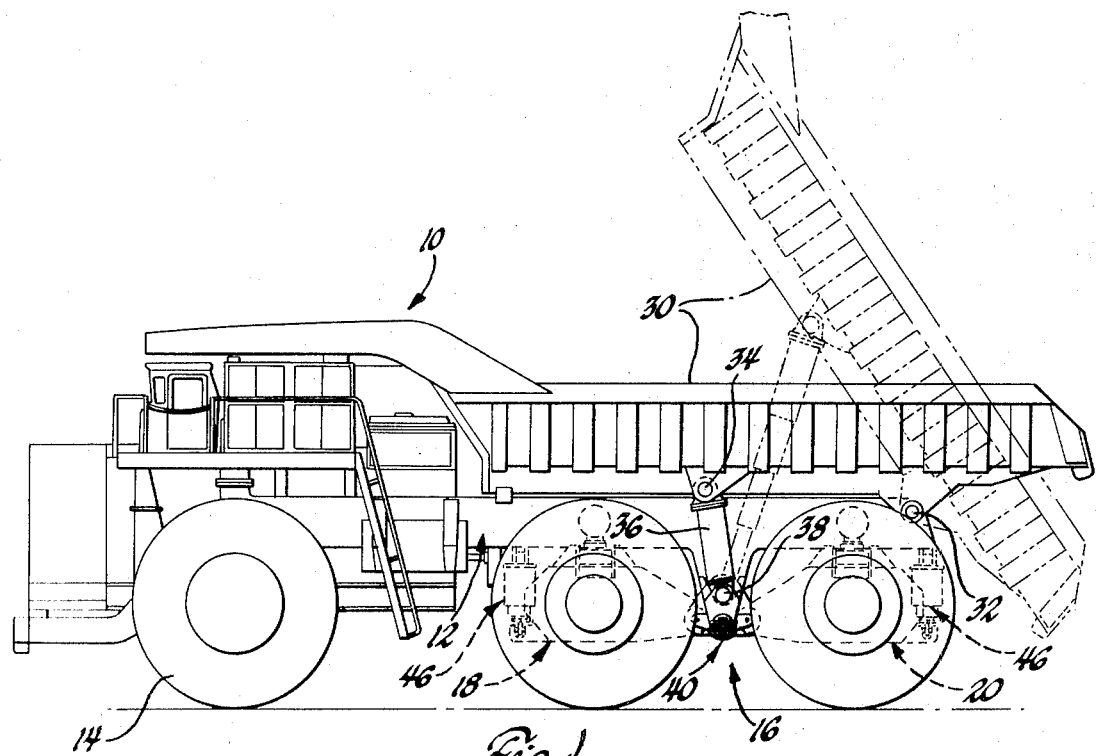
FIG. 1 is an elevational view showing a six-wheeled vehicle incorporating a steerable tandem axle suspension made according to the invention.
Figure 2:
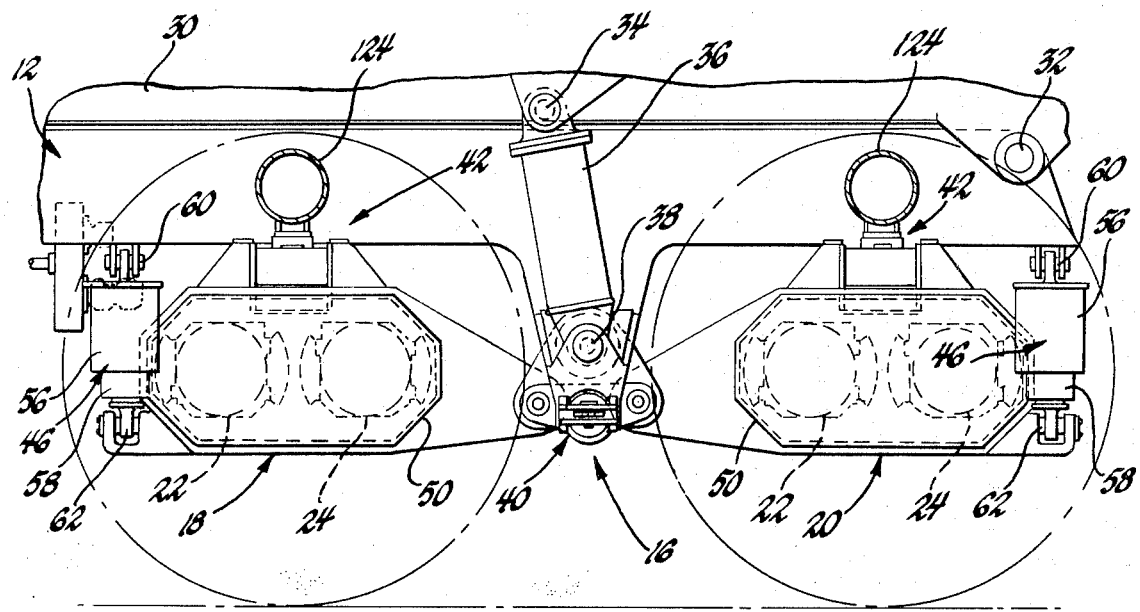
FIG. 2 is an enlarged view showing the steerable tandem axle suspension employed by the vehicle of FIG. 1.

Referring to the drawings and more specifically FIGS. 1, 2 and 12 thereof, an off-highway six-wheeled rear dump vehicle 10 is shown comprising, in general, a vehicle frame 12 the forward end of which supports a pair of dirigible front wheels 14. The frame 12 is formed as a rigid full box section with side rails interconnected by torque tube stiffeners and has the rear portion thereof supported by a steerable tandem suspension 16 which includes a pair of longitudinally spaced rear axles 18 and 20 each of which is provided with dual tires at the opposite ends thereof. The vehicle 10 is electrically powered by a diesel-generator set supported by the frame 12 above the front wheels 14 that serves to supply electricity to a pair of series wound traction motors 22 and 24 supported within each of the rear axles 18 and 20. The respective traction motors 22 and 24 are connected through suitable gearing not shown to final drive and wheel assemblies 26 and 28, seen in FIG. 3, which transmit driving torque to the dual tires at the opposite end of each axle.

A material-handling chute-type body 30 is carried by the frame 12 above the rear axles 18 and 20 and has the rear end thereof connected by laterally spaced pins 32 to the frame 12 for pivotal movement about a transverse horizontal axis. An intermediate portion of the body 30 outboard of each side rail of the frame 12 is connected by a pivotal connection 34 to one end of a multi-stage double-acting inverted hydraulic hoist 36 the other end of which is connected by a pivotal connection 38 to the vehicle frame 12 between axles 18 and 20. Thus, by expanding the multistage hoist 36, the body 30 is moved about the pins 32 to the phantom-line position shown in FIG. 1 for dumping a load. It will also be noted that the rear axles 18 and 20 are supported by the frame 12 and connected to a steering actuator 40 so when the vehicle 10 is negotiating a curve, the rear axles 18 and 20 are simultaneously positively moved about longitudinally spaced vertical axes into steered positions so as to minimize wheel slippage and tire scuffing that normally occurs in six-wheeled vehicles.

More specifically and as seen in FIG. 2, the steerable tandem axle suspension 16 made according to the invention comprises the rear axles 18 and 20, the steering actuator 40, a pair of identical swivel assemblies 42, and two pair of transversely spaced ride cylinders 46 and 48. It will be noted that both rear axles 18 and 20 are identical in construction and each includes a housing 50 which has an enlarged central portion for supporting the traction motors 22 and 24 referred to above. The housing 50 has one end thereof integrally formed with an arm 52 that projects towards the steering actuator 40 and is supported thereby in a manner to be described hereinafter. The other end of each housing 50 is formed with a pair of outwardly projecting ears 54 and 55 which respectively serve as connecting points for the lower ends of the ride cylinders 46 and 48.

As best seen in FIG. 2, each ride cylinder 46 and 48, in the preferred form, consists of a pair of relatively movable cylindrical housing members 56 and 58 between which a plurality of resilient rubber pad members are provided for cushioning oscillatory movement of the associated axle. The housing members 56 and 58 of each ride cylinder 46 and 48 are respectively mounted to the frame 12 and the axle through spherical pivotal connections 60 and 62 which include pins that extend along axes that are parallel to the longitudinal axis of the vehicle. As seen, each axle housing 50 midway between the associated wheels is connected by the swivel assembly 42 to the vehicle frame 12. The swivel assembly 42 allows the associated rear axle to oscillate about a longitudinally extending horizontal axis, and also permits the rear axle to oscillate about a transverse axis extending through a spherical connection, to be described hereinafter, between the arm 52 and the steering actuator assembly 40. One further function of the swivel assembly 42 is to allow each rear axle to be steered about a vertical axis which extends through the swivel assembly.

Figure 10:
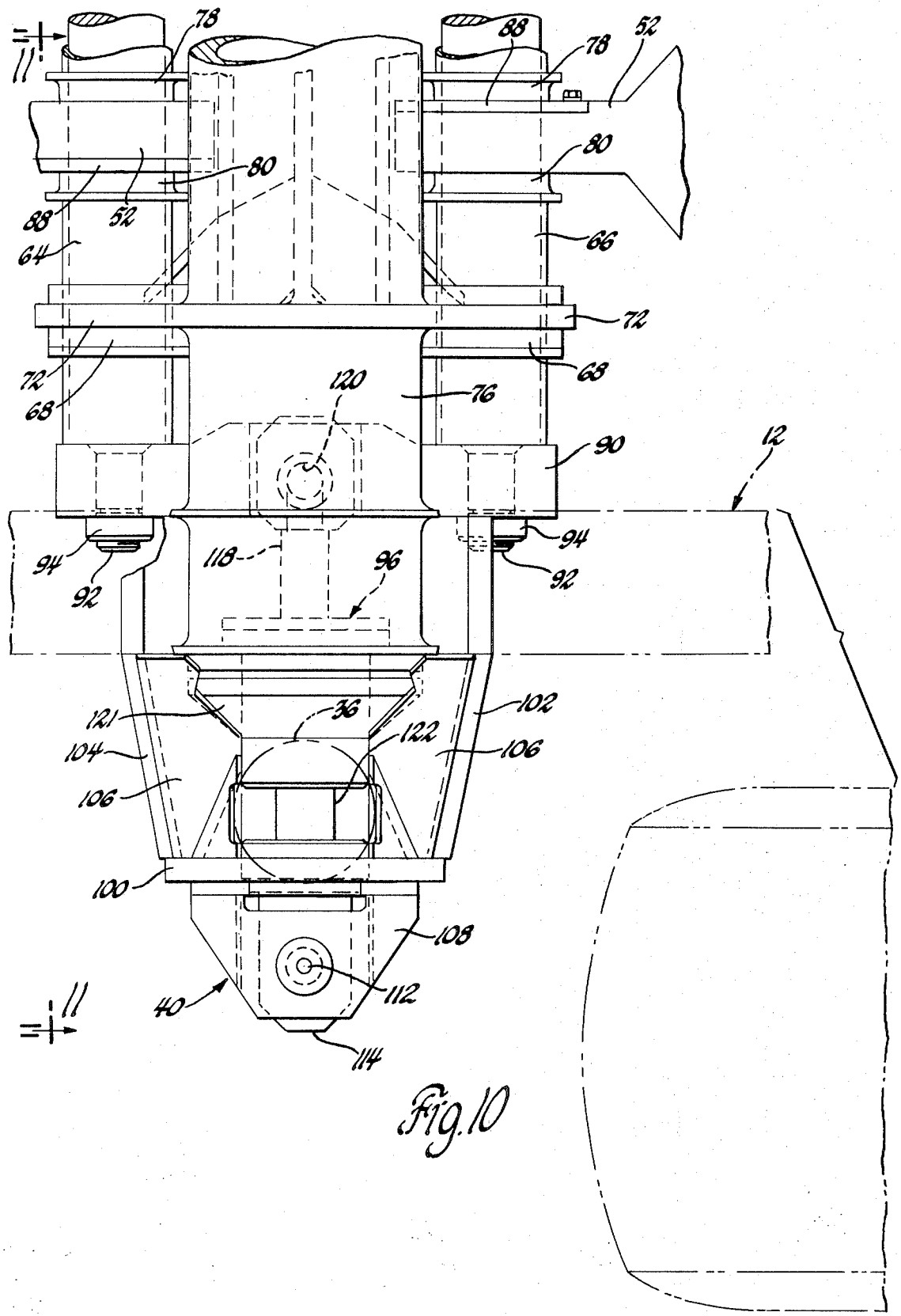
FIG. 10 is a plan view of a portion of the steering actuator taken on lines 10—10 of FIG. 9.
Figure 11:
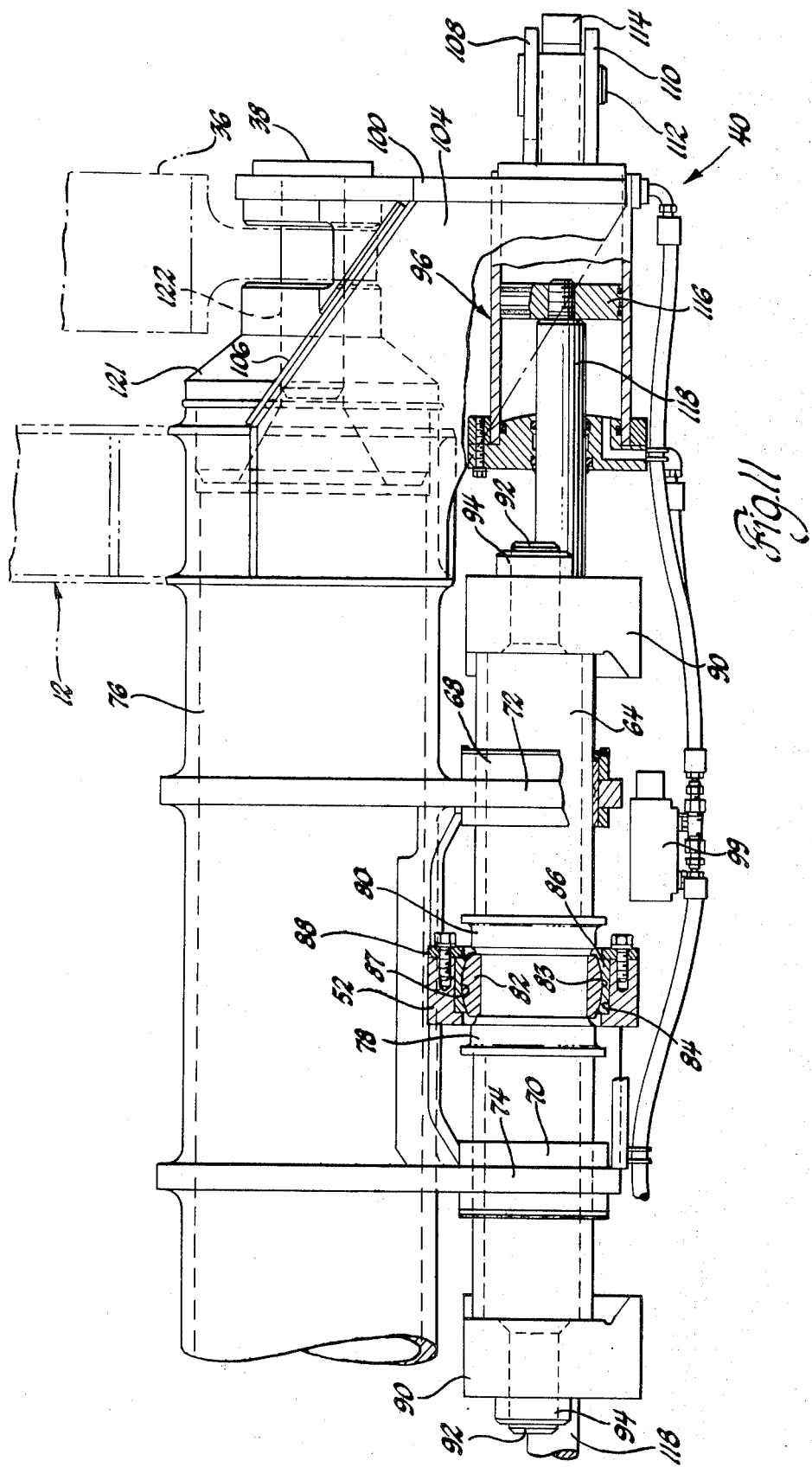
FIG. 11 is a side elevational view of the steering actuator taken on lines 11—11 of FIG. 10.

The steering actuator 40 can be seen in detail in FIGS. 3, 9, 10 and 11 and comprises a pair of identically formed transversely extending and parallel rods 64 and 66. Each of the rods 64 and 66 is supported for axial movement by a pair of spaced bushing means 68 and 70 which are respectively fixedly mounted within accommodating bores formed in ears 72 and 74 which radially extend from and are integrally formed with a transversely extending tubular support 76. As best seen in FIG. 11, the tubular support 76, in turn, is secured adjacent its opposite ends to the side rails of the vehicle frame 12.

Each rod 64 and 66 carries stop collars 78 and 80 and sleeve members which serve as confining means for a bearing member 82 having an outer spherical surface 83. The bearing member 82, in turn, carries the arm 52 of the axle housing 50, and in this regard, it will be noted that each arm 52 is formed with a stepped bore 84 which carries a bushing 86 having an inner spherical surface 87 for mating engagement with the spherical surface 83 of bearing member 82. Suitable fastening means are provided for connecting an end ring 88 to the arm 52 for retaining the bushing 86 in the bore 84 and thereby holding the arm 52 in position on the bearing member 82 so as to provide a spherical connection between the arm 52 and the associated rod.

As seen in FIGS. 10 and 11, the adjacent ends of the rods 64 and 66 are interconnected by a cross bar 90 and it will be noted that each end of each rod 64 and 66 is formed with an integral threaded stub member 92 which extends into a suitable aperture formed in the cross bar 90. The cross bar 90 is fastened to the rods 64 and 66 through nuts 94 which are threadably received by the stub members 92. Thus, the rods 64 and 66 are connected together for conjoint movement which is provided by a pair of identical horizontally aligned double-acting hydraulic cylinders 96 and 98 carried by an extension of the frame 12. In this regard, it will be noted that adjacent each end of the tubular support 76, a vertical plate 100 fixed with a pair of side plates 102 and 104 and top plates 106 extend from the side of the frame 12 and forms a box section which is rigid with the frame and projects laterally outwardly therefrom. A pair of brackets 108 and 110 are bolted to the plate 100 and serve to receive a vertical pin 112 which extends through an ear member 114 rigidly formed with the cylinder portion of the associated hydraulic cylinder.

Each hydraulic cylinder 96 and 98 houses the usual piston 116 that is fixed in each instance with a piston rod 118 connected to the cross bar 90 by a pivotal connection 120. A control valve 99 serves to direct pressurized fluid to the hydraulic cylinders 96 and 98. Thus, when the pressurized fluid is directed to the head end of cylinder 96, the fluid also flows to the rod end of cylinder 98, so the pistons 116 of the cylinders will be moved in a leftward direction as seen in FIG. 11 causing the cross bar 90 to move the rods 64 and 66 in a similar direction. On the other hand, by directing pressurized hydraulic fluid to the piston rod end of the hydraulic cylinder 96 and the head end of hydraulic cylinder 98, the pistons 116 thereof as well as the cross bar 90 and the rods 64 and 66 will be moved in a rightwardly direction as seen in FIG. 11. As should be apparent, movement of the rods 64 and 66 in either of the aforementioned directions causes movement of the bearing members 82 and accordingly the arms 52 of the axles 18 and 20 which are connected to the rods as described hereinbefore. In addition, it will be noted the hydraulic cylinders 96 and 98 are adapted to work together for moving the rods 64 and 66 in the appropriate direction for causing steering movement of the axles 18 and 20.

The opposite ends of the tubular support 76 are capped with identical bell-shaped members one of which is seen in FIG. 11 and identified by the numeral 121. The eye formed with the lower end of the body hoist 36 is located between the member 121 and the associated plate 100 for connection with the vehicle frame 12. Thus, as seen in FIG. 11, a horizontal pin 122 extends through plate 100 into the end of the member 121 and provides the pivotal connection 38 for the lower end of the hoist 36. As alluded to, a similar arrangement is provided at the opposite end of the tubular support 76.

The swivel assembly 42 which serves to connect the upper surface of each axle housing 50 to the vehicle frame 12 can be seen in FIGS. 4 through 8. As seen in the latter mentioned Figures, a torque tube stiffener 124, which is a part of frame 12 and is located directly above each swivel assembly, is rigidly formed with a box section consisting of a pair of transversely extending side plates 126 and 128 located in vertically extending parallel planes. The lower edges of the side plates 126 and 128 are rigidly interconnected by bottom plates 130 and 132 and the central portion of the box section is formed with a U-shaped slot. The slot serves as a pocket for accommodating a cushioning device which is generally indicated by the numeral 134 and is carried by the axle housing 50. The slot is defined by transversely spaced and parallel end walls 136 and 138 which merge and are integral with a horizontally disposed top wall 140. It will be understood that the end walls 136 and 138 and the top wall 140 are securely fastened to the side plates 126 and 128 and each end wall is fitted with a wear plate 142 which cooperates with the cushioning device 134 as will be described hereinafter.

Figure 4:
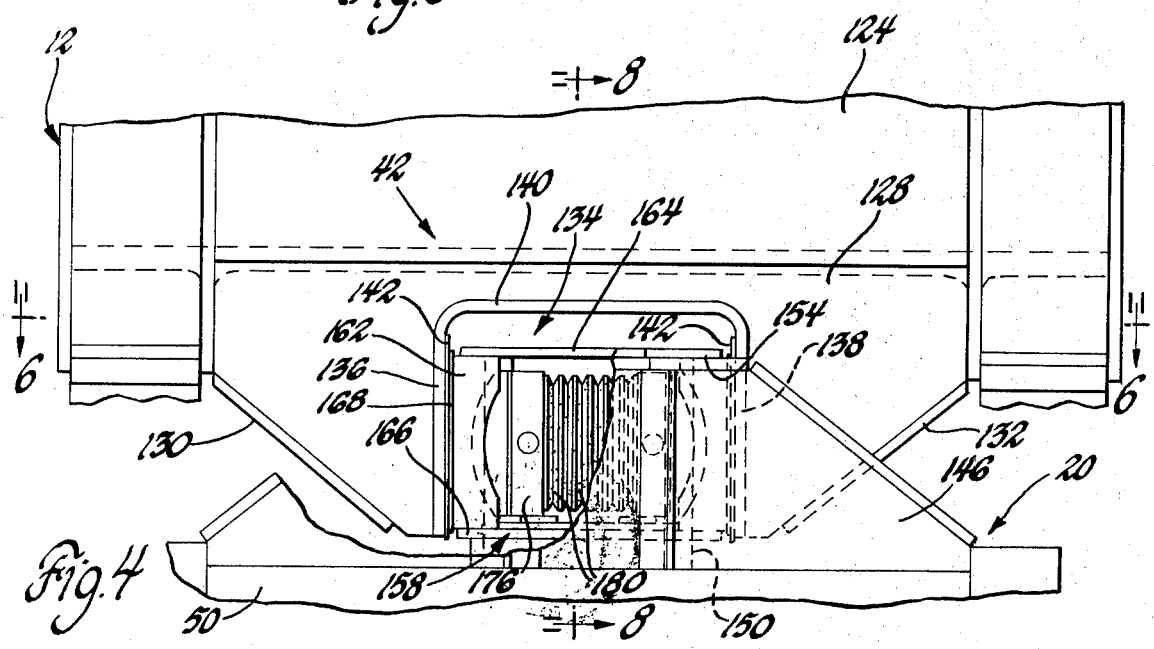
FIG. 4 is an enlarged view taken on lines 4—4 of FIG. 3 showing the swivel assembly incorporated with each axle.

The upper portion of each axle housing 50 is formed with a pair of transversely extending and upstanding walls 144 and 146 which are located in vertical planes that are parallel to each other. A plurality of gusset members 148 serve to rigidly maintain the walls 144 and 146 in position and, as seen in FIGS. 4, 6 and 7, each wall is fixedly provided with a pair of vertically extending bars 150 and 152. The upper ends of the bars 150 and 152 on each wall are interconnected by a strap 154 while the lower ends are secured to a bottom plate 156 so as to form a rectangular well which serves to house a portion of the cushioning device 134 in a manner to be described.

Figure 8:
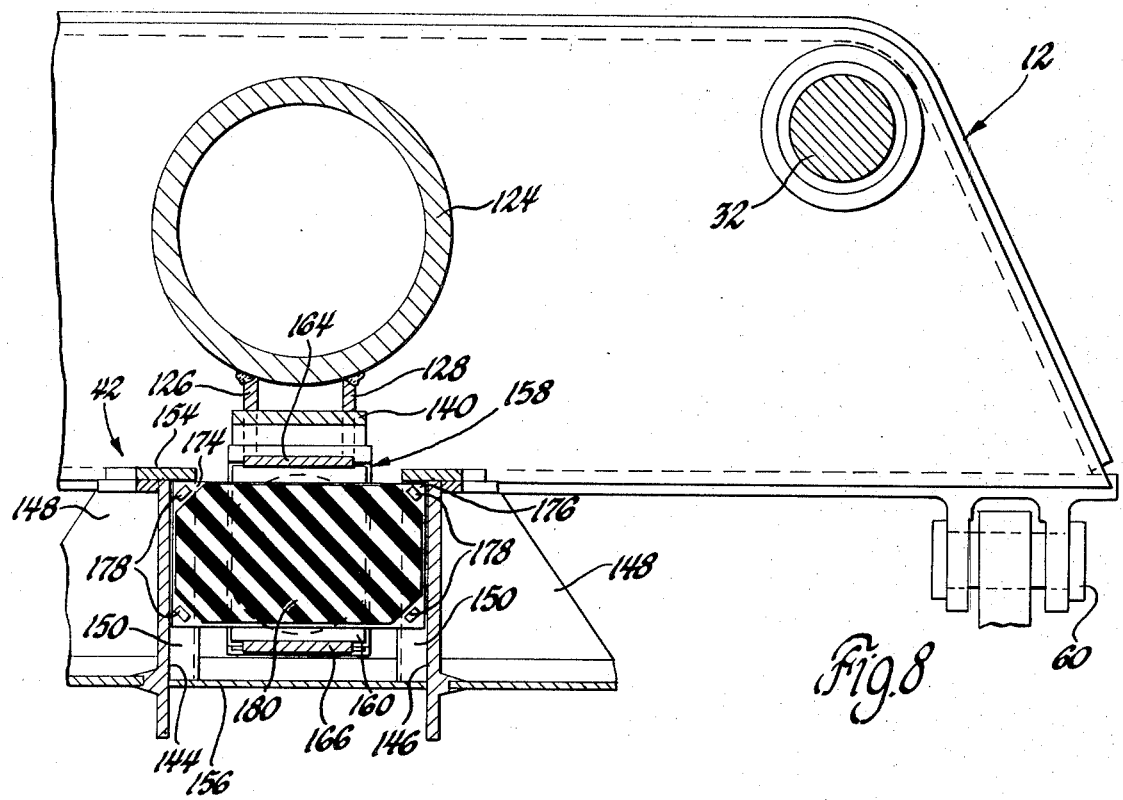
FIG. 8 is a sectional view taken on lines 8—8 of FIG. 4 showing the interior construction of the swivel assembly.
Figure 9:
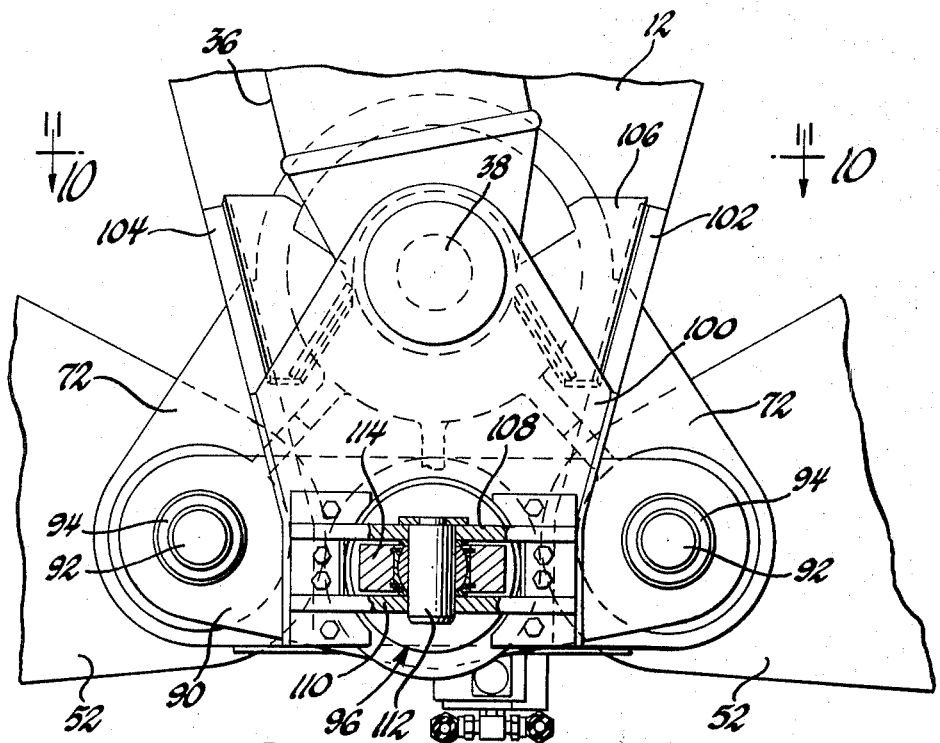
FIG. 9 is an enlarged elevational view taken on lines 9—9 of FIG. 3 showing the steering actuator which serves to move the rear axles into steered positions.

In this regard, it will be noted that the cushioning device 134 comprises a housing 158 which is defined by a pair of end block members 160 and 162 which are rigidly interconnected by upper and lower plate members 164 and 166 respectively. The end block members 160 and 162 are formed with outer walls each of which rigidly carries a wear plate 168 for surface to surface contact with the wear plate 142 mounted within the slot in the frame 12. The inner end of each end block member 160 and 162 is formed with a concave spherical bearing surface 170 which is adapted to serve as a seat for a bearing member 172. The bearing member 172 is formed with a pair of arms 174 and 176 each of which has a pair of tabs 178 projecting outwardly therefrom as seen in FIG. 8. Thus, each bearing member 172 has a portion thereof formed with a convex spherical bearing surface 179 which mates with the bearing surface 170. Located between the bearing members 172 and being retained by the tabs 178 are a plurality of rectangular rubber pads 180 which are preloaded when the cushioning device 134 is assembled, so they serve to exert an outward force on each of the bearing members 172 causing the spherical bearing surfaces 179 thereof to maintain engagement with the spherical bearing surfaces 170 formed on the end blocks members 160 and 162.

Figure 3:
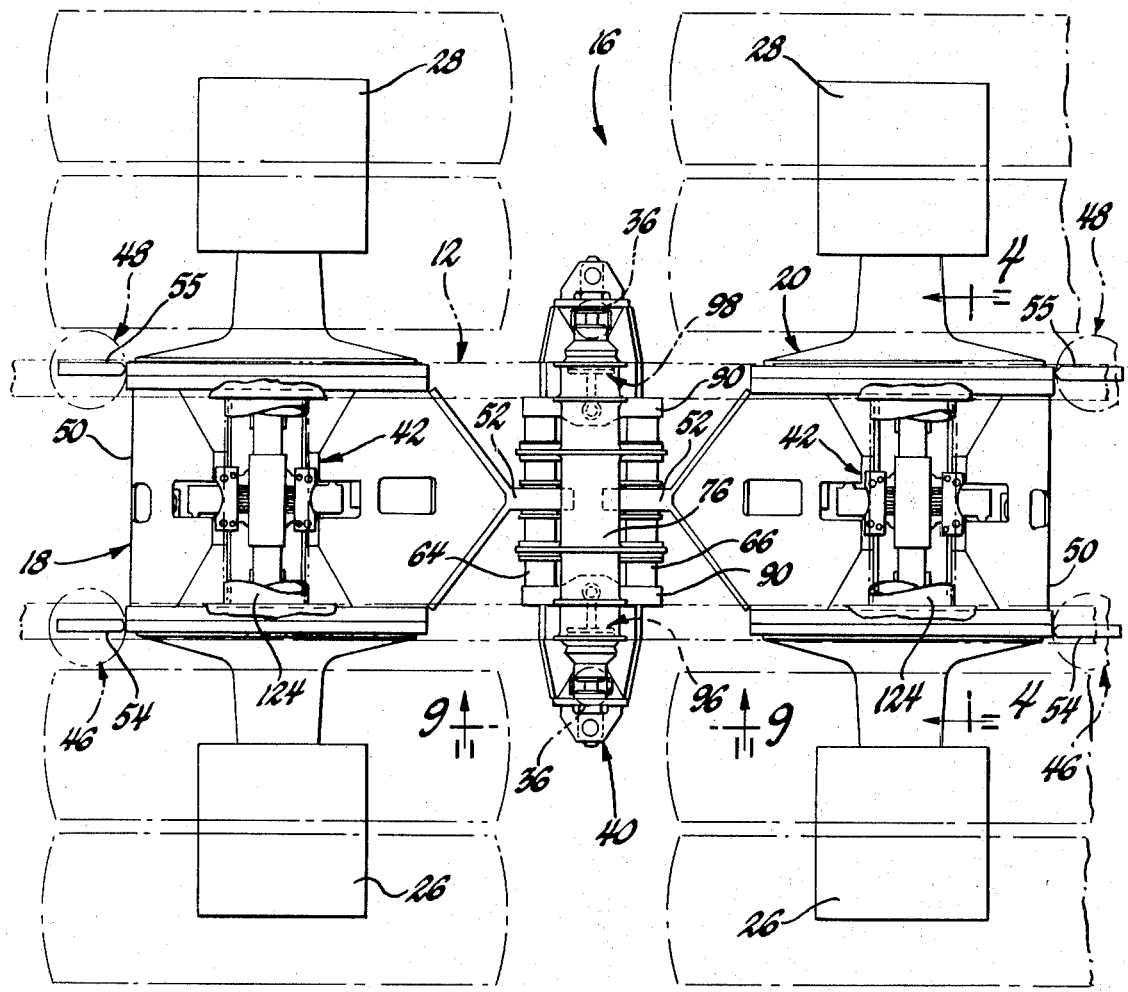
FIG. 3 is a plan view of the suspension shown in FIG. 2.

As seen in FIGS. 6 and 7, the outwardly extending arms 174 and 176 of each bearing member 172 are received within the wells formed by the vertical bars 150 and 152 and the straps 154 connected with each wall 144 and 146. Thus, from the above description, it should be apparent that the cushioning device 134 is carried by the walls 144 and 146 connected with the axle housing 50. The arrangement is such that oscillation of the axle housing 50 about an axis extending longitudinally of the vehicle will be allowed due to the fact that the bearing members 172 together with the end block members 160 and 162 essentially form a ball and socket type connection which allows the axle to oscillate about the aforesaid axis, as shown in FIG. 5, and also rotate about a vertical axis for steering purposes as shown in FIG. 7. Also as seen in FIGS. 2, 3, and 5, the swivel assemblies 42 allow the axles 18 and 20 to oscillate about transverse horizontal axes passing through the centers of the rods 64 and 66. As should be apparent, such oscillation will be cushioned by the ride cylinders 46 and 48 associated with each axle and during such oscillation the cushioning device 134 will move along an arc vertically up and down along the wear plates 142 and within the accommodating pocket described hereinbefore. In addition, it will be noted that lateral forces acting on the vehicle frame will be cushioned by the rubber pads 180 located between the bearing members 172 and can result in one bearing member losing contact with its spherical seat on the associated end block member when a large force indicated by the letter "F" acts on the frame in the direction as seen in FIGS. 5 and 7.

Each swivel assembly 42 also allows the associated axle to move in a fore and aft direction along the longitudinal axis of the vehicle. In this regard and as seen in FIG. 7, it can be seen that the axle assembly 20 and accordingly the cushioning device 134 have shifted in a leftward direction relative to the frame 20 and in a direction towards the steering actuator 40. Such movement will normally occur when the rear axles 18 and 20 are moved to a steered position by the steering actuator 40 as explained hereinbefore. The fore and aft movement must necessarily occur because during steering of the axles, the arm 52 attached to each axle moves along a straight line represented by the longitudinal axes of the rods 64 and 66 which are normal to the longitudinal axis of the vehicle.

Although not shown, the above described vehicle incorporates a steering control system which upon a predetermined steering movement of the front wheels 14 will serve to direct pressurized fluid to the appropriate ends of the hydraulic cylinders 96 and 98 incorporated with the steering actuator 40 to cause steering movement of the rear axles 18 and 20. The steering control system includes an appropriate actuator, either electrical or mechanical, which upon rotation of the front wheels 14 approximately 10° will serve to energize the control valve 99 for directing pressurized fluid to the appropriate ends of the hydraulic cylinders 96 and 98. For example and as seen in FIG. 12, when the front wheels 14 are rotated in a clockwise direction from a phantom-line straight-ahead position to the full-line position, the head end of the hydraulic cylinders 98 and the rod end of the hydraulic cylinder 96 will receive pressurized fluid so as to cause the rods 64 and 66 and the cross bars 90 to be moved towards the hydraulic cylinder 96. Such movement, in turn, causes the spherical connections which join the arms 52 of the axles 18 and 20 to the steering actuator 40 to be moved along parallel and transversely extending axes and cause the axle 20 to be rotated counterclockwise about its swivel assembly 42 and the axle 18 to be rotated clockwise about its swivel assembly. Accordingly, the axles 18 and 20 will be positively steered so as to facilitate the turning movement of the vehicle and thereby prevent scuffing and unnecessary wear of the rear tires. It will be understood that steering movement of the front wheels 14 in a counter-clockwise direction as seen in FIG. 12, will result in the hydraulic cylinder 96 being expanded and the hydraulic cylinder 98 being contracted so that the cross members 90 and the rods 64 and 66 will be shifted towards the cylinder 98. Such movement will cause the axle 18 to be rotated counterclockwise about its swivel assembly 42 while axle 20 will be rotated clockwise about its swivel assembly.

It is intended that the degree of steerability provided for each axle 18 and 20 of the vehicle 10 be between 7 and 10 degrees. It should be apparent, however, that the amount of steerability allowed for each axle will be determined by the distance between the axes of wheel rotation of both axles 18 and 20 and the size of the various parts thereof and can be increased or decreased depending on design requirements. As aforementioned, movement of the rods 64 and 66 during a steering operation causes each of the axles 18 and 20 to pivot about a vertical axis passing through the associated swivel assembly 42. In addition, inasmuch as the spherical connection at the arm 52 moves along a straight line, each swivel assembly 42 allows the associated axle to move towards the steering actuator 40 during the steering maneuver.

Various changes and modifications can be made in this construction without departing from the spirit of the invention. Such changes and modifications are contemplated by the inventors and they do not wish to be limited except by the scope of the appended claims.

We claim:

1. A steerable tandem axle suspension for supporting the rear end of a vehicle frame, said suspension comprising first and second transversely extending axles having rotatable wheels at the opposite ends thereof, each of said axles including a housing having a rigid arm which projects along the longitudinal center axis of the vehicle frame towards the other axle, a steering actuator carried by the vehicle frame between said axles and having rod means supported for movement along an axis perpendicular to said longitudinal axis of said vehicle frame, a spherical connection joining the end of each of said arms to said rod means at a predetermined point thereof, a swivel assembly located between the wheels of each axle and serving to connect the upper mid-section of the housing to the vehicle frame, for steering movement about a vertical steer axis upon axial movement of said rod means, said swivel assembly comprising means for allowing the associated axle to oscillate about a horizontal axis extending longitudinally of the vehicle frame and to be steerable about the vertical steer axis, means connecting the latter mentioned means to the vehicle frame so as to permit said mid-section of the axle to move fore and aft along the longitudinal axis of the vehicle frame when the axle is steered about said vertical steer axis and to allow the axle to oscillate about a transverse axis passing through said rod means, and a pair of transversely spaced ride cylinders pivotally connected between each axle and the vehicle frame for cushioning the oscillatory movement of the axle.

2. A steerable tandem axle suspension for supporting the rear end of a vehicle frame, said suspension comprising first and second transversely extending axles having rotatable wheels at the opposite ends thereof, each of said axles including a housing having a rigid arm which projects along the longitudinal center axis of the vehicle frame towards the other axle, a steering actuator carried by the vehicle frame between said axles and having rod means supported for axial movement along an axis perpendicular to said longitudinal axis of said vehicle frame, a spherical connection joining the end of each of said arms to said rod means at a predetermined point thereof, a swivel assembly located between the wheels of each axle and serving to connect the upper mid-section of the housing to the vehicle frame for steering movement about a vertical steer axis upon axial movement of said rod means, said swivel assembly comprising spring means for limiting lateral movement of the vehicle frame relative to said axles, means incorporated in the swivel assembly for allowing the associated axle to oscillate about a horizontal axis extending longitudinally of the vehicle frame and to be steerable about the vertical steer axis, means connecting the latter mentioned means to the vehicle frame so as to permit said mid-section of the axle to move fore and aft along the longitudinal axis of the vehicle frame when the axle is steered about said vertical steer axis and to allow the axle to oscillate about a transverse axis passing through said rod means, and a pair of transversely spaced ride cylinders pivotally connected between each axle and the vehicle frame for cushioning the oscillatory movement of the axle.

3. A steerable tandem axle suspension for supporting the rear end of a vehicle frame, said suspension comprising first and second transversely extending axles having rotatable wheels at the opposite ends thereof, each of said axles including a housing having an arm which projects along the longitudinal center axis of the vehicle frame towards the other axle, a steering actuator carried by the vehicle frame between said axles and having rod means supported for movement along an axis perpendicular to said longitudinal axis of said vehicle frame, a spherical connection joining the end of each of said arms to said rod means at a predetermined point thereof, a swivel assembly located between the wheels of each axle and serving to connect the upper portion of the housing to the vehicle frame, for steering movement about a vertical steer axis upon axial movement of said rod means, said swivel assembly including a ball and socket connection for allowing the associated axle to oscillate about a horizontal axis extending longitudinally of the vehicle frame and to be steerable about the vertical steer axis, means connecting the ball and socket connection of each swivel assembly to the vehicle frame so as to cause said upper portion of the axle to move fore and aft along the longitudinal axis of the vehicle frame when the axle is steered about said vertical steer axis and to allow the axle to oscillate about a transverse axis passing through said rod means, and a pair of transversely spaced ride cylinders pivotally connected between each axle and the vehicle frame for cushioning the oscillatory movement of the axle.

4. In combination with a vehicle having a frame the front end of which is provided with a pair of dirigible wheels, a steerable tandem axle suspension for supporting the rear end of said frame, said suspension comprising first and second transversely extending axles having rotatable wheels at the opposite ends thereof, each of said axles including a housing having a rigid arm which projects along the longitudinal center axis of the frame towards the other axle, a steering actuator carried by the frame between said axles and having rod means supported for axial movement along an axis perpendicular to said longitudinal axis of said frame, a spherical connection joining the end of each of said arms to said rod means at a predetermined point thereof, a swivel assembly located between the wheels of each axle and serving to connect the upper mid-section of the housing to the frame, for steering movement about a vertical steer axis upon axial movement of said rod means, said swivel assembly comprising resilient pad means for limiting lateral movement of the frame relative to said axles, a ball and socket connection incorporated in the swivel assembly for allowing the associated axle to oscillate about a horizontal axis extending longitudinally of the vehicle frame and to be steerable about the vertical steer axis, means connecting the ball and socket connection of each swivel assembly to the frame so as to permit said mid-section of the axle to move fore and aft along the longitudinal axis of the frame when the axle is steered about said vertical steer axis and to allow the axle to oscillate about a transverse axis passing through said rod means, and a pair of transversely spaced ride cylinders pivotally connected between each axle and the frame, each of said ride cylinders comprising relatively telescoping cylinder members having resilient pad members therebetween for cushioning the oscillatory movement of the axle.

* * * * *